Dec. 30, 1958 W. C. WEHNER 2,866,351
VARIABLE SPEED ROTARY MOWERS
Original Filed April 4, 1955 2 Sheets-Sheet 2

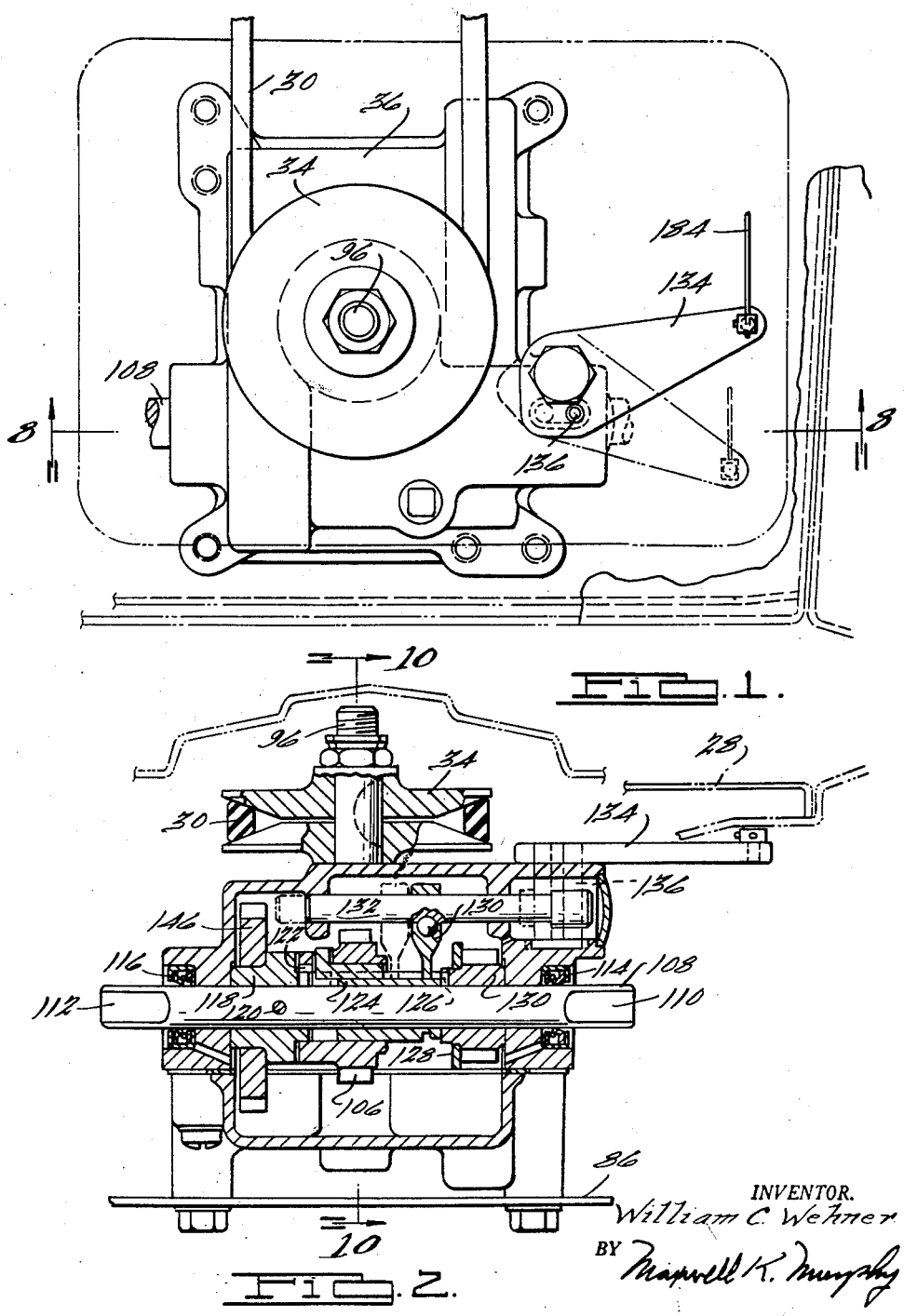

INVENTOR.
William C. Wehner
BY
Maxwell K. Murphy
ATTORNEY

United States Patent Office 2,866,351
Patented Dec. 30, 1958

2,866,351

VARIABLE SPEED ROTARY MOWERS

William C. Wehner, Grosse Pointe, Mich., assignor, by mesne assignments, to Moto-Mower, Inc., a corporation of Delaware Original application April 4, 1955, Serial No. 498,997. Divided and this application April 12, 1957, Serial No. 652,404

1 Claim. (Cl. 74—370)

This invention relates to power transmissions for lawn mowers of the rotary blade type and like small vehicles, and particularly to self-propelled mowers of this type, and this application is a division of my co-pending application Serial No. 498,997, filed April 4, 1955.

Lawn mowers having a motor-driven, horizontally disposed blade have become increasingly popular in recent years because of their versatility. In the majority of rotary mowers now on the market, the engine is mounted such that the crankshaft thereof is vertically disposed and the cutter blade is mounted directly on the lower end of the crankshaft and rotates at engine speed. Because of this mounting of the engine, difficulty and expense have been encountered in providing a suitable power connection from the engine crankshaft to the wheels of the mower, and for this reason, the wheels of the machine are not driven in most instances.

In instances where a power connection to the wheels has been provided in order to make the machine a true power lawn mower, complaints have arisen because of the absence of provision for varying the speed of traverse independently of the blade speed. Rotary mowers are usually purchased by people whose lawns or grounds vary in type of grass or stubble, roughness, grade, etc. In cases where grass of fairly uniform texture is being cut, the mower engine throttle can be adjusted to provide a comfortable walking speed of traverse and the rotational speed of the blade is not too important. However, when cutting relatively heavy undergrowth, weeds, tall grass, etc., it is desirable that the blade be rotated at maximum speed and the traversing speed be reduced. Sometimes when mowing in restricted space, it is advantageous to be able to release the drive to the mower wheels and traverse the mower entirely by pushing and pulling.

Accordingly, it is the principal object of this invention to provide a mower of the rotary type wherein the blade and the traversing wheels are power-driven and wherein means is provided for selectively varying the speed of traversal of the mower independently of blade speed and for disconnecting the drive to the mower wheels without shutting off blade rotation.

Other objects and advantages of the invention will be apparent from the following specification which, taken in conjunction with the accompanying drawings, describes a preferred embodiment thereof.

In the drawings,

Fig. 1 is a plan view of the change-speed transmission;

Fig. 2 is a vertical section taken along the line 8—8 of Fig. 1;

The gearbox 36 is carried on a plate 86 which is suitably suspended from the deck of the mowing machine.

Figure 4:
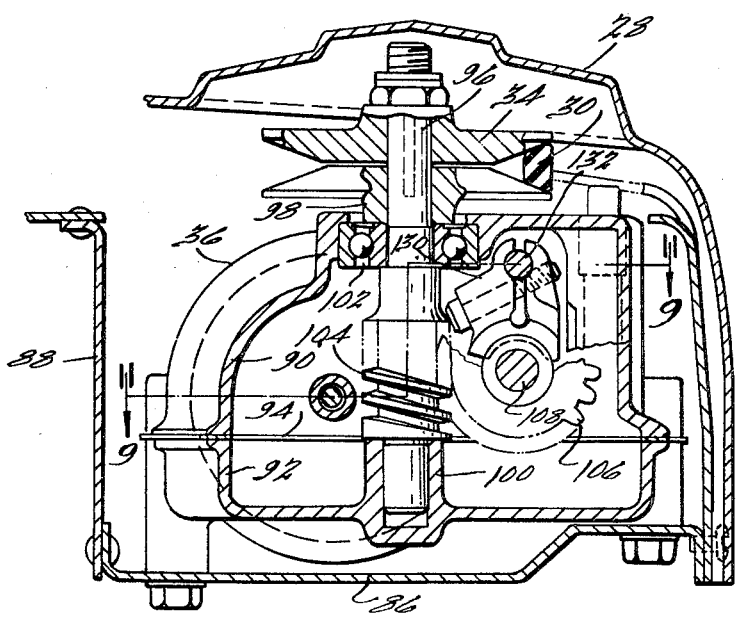
Fig. 4 is a vertical section taken along line 10—10 of Fig. 2.

The gearbox 36 has a die cast top housing 90 and a similar lower housing 92 secured thereto by bolts with a gasket 94 between. The input shaft 96 extends upwardly through a boss 98 in the top housing, the lower end of the shaft being journaled in an internal boss 100 formed in the lower housing (see Fig. 4). A ball bearing 102 carried internally of the boss 98 provides antifriction support for the shaft adjacent the driven pulley 34.

Formed integrally on shaft 96 is a worm 104 disposed in meshing engagement with a driven gear 106 carried on the transmission output shaft 108. The latter is provided with milled flats 110, 112, on each of its ends for driving connection to the axle shafts 52. The output shaft is journaled in bored bearing openings in the opposite side walls of the upper gearbox housing, leather oil seals 114, 116, being provided as shown.

An output clutch member and gear hub 118 is keyed to shaft 108 by means of a hardened roll pin 120. The clutch member 118 has clutch teeth 122 engageable by corresponding teeth formed on a slidable clutch member 124. The latter is freely slidable and rotatable on the shaft 108 and has a splined driving connection with the driven gear 106. The opposite end of the clutch member 124 is formed with clutch teeth 126 which are engageable with similar teeth formed on a clutch member 128, the latter being secured to and carried by a gear 130 which is journaled on the shaft 108. The shiftable clutch member 124 is adapted to be shifted axially of the shaft 108 by a shifter fork 131 carried by slidable rod 132. The rod 132 is in turn moved to and fro by shift lever 134 through a pin connection 136.

Figure 3:
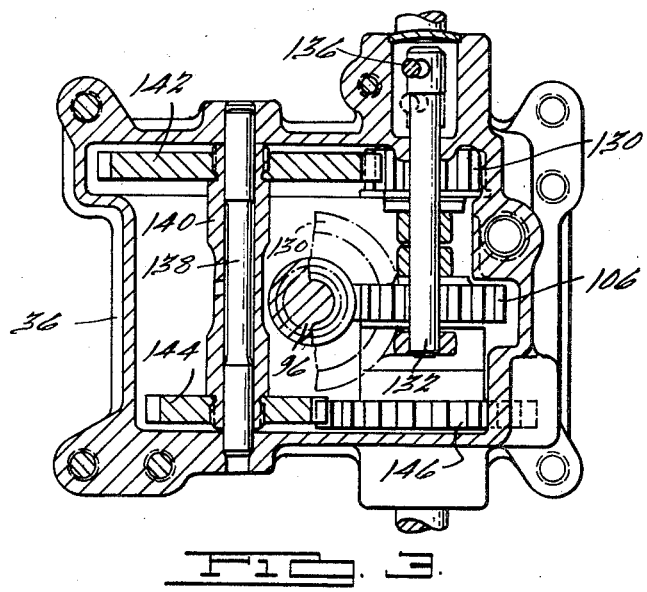
Fig. 3 is a horizontal section taken along line 9—9 of Fig. 4.

Mounted in the upper gearbox housing on the opposite side of the input shaft 96 is a countershaft 138 (Fig. 3) on which is rotatably carried a cluster gear assembly 140 comprising a gear 142 disposed in constant mesh with the gear 130 and a gear 144 disposed in constant mesh with a gear 146 carried by the hub member 118.

Operation of the variable speed transmission will be understood from the foregoing. When the shifter lever 134 is in the full line position shown, clutch member 124 is engaged with the clutch teeth of low-speed gear 130 and drive from the engine 16 to the wheels 14 is through pulley 34, input shaft 96, worm 104, driven gear 106, clutch member 124, low-speed gear 130, cluster gear 142, cluster gear 144, high-speed gear 146, clutch member 118, shaft 108 and axles 52.

When the shifter lever 134 is in the broken line position, the clutch member 124 has been shifted toward the left of Fig. 2, thereby to disengage it from the gear 130 and engage it with the clutch teeth 122 on the hub 118. The drive is now direct from the gear 106 through clutch member 124, hub member 118 and shaft 108. Under direct drive conditions the cluster gears are rotated by high-speed gear 146, but because low-speed gear 130 free-wheels on shaft 108, the ratio-reduction gear train idles.

Shifter lever 134 may be moved to a position intermediate those illustrated, in which event the clutch member 124 does not engage either set of mating clutch teeth and a neutral, non-driving condition results with the worm 104 and gear 106 only rotating.

The shifter lever 134 is movable from the handle of the moving machine, as described in my parent application. It will be appreciated that the shifter mechanism just described permits the mower engine to be started with the transmission in neutral position and the lever 134 may be left in neutral for cutting around flower beds, against fences, etc., where it is more convenient to maneuver by manual effort.

Shift of the transmission into high-speed position will permit a driving speed of about 2½ M. P. H. or lower depending upon the engine throttle setting. With the transmission in low-speed position, a maximum speed of about ¾ M. P. H. is obtainable. Both of these driving speeds may be had with maximum revolution speed of the cutting blade thereby providing extreme flexibility with excellent cutting efficiency.

I claim:

A compact change-speed power transmission for lawn mowers and the like comprising in combination, a casing, a removable bottom cover for said casing having an internal upwardly presenting boss integrally formed therewith, an output shaft journaled in said casing and extending horizontally thereof, a countershaft journaled in said casing parallel to said output shaft, spaced sets of intermeshing gears carried by said shafts, a worm wheel carried by said output shaft between said sets of intermeshing gears, an input shaft disposed vertically between the aforesaid shafts with its lower end journaled in said boss, a worm carried on said input shaft and intermeshed with said worm wheel, a bearing mounted in the top wall of said casing for journaling said input shaft intermediate its ends, said input shaft extending upwardly from said casing for connection to a power source.

References Cited in the file of this patent

UNITED STATES PATENTS

| | | |
|---|---|---|
| 1,816,867 | Potter | Aug. 4, 1931 |
| 1,938,201 | Wells | Dec. 5, 1933 |
| 2,139,221 | Bronander | Dec. 6, 1938 |
| 2,220,504 | Wein | Nov. 5, 1940 |
| 2,524,791 | Hackett | Oct. 10, 1950 |